(12) United States Patent
Zhou et al.

(10) Patent No.: US 7,927,410 B2
(45) Date of Patent: Apr. 19, 2011

(54) NEAR INFRARED DYE COMPOSITION

(75) Inventors: Zhang-Lin Zhou, Palo Alto, CA (US); Sivapackia Ganapathiappan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 135 days.

(21) Appl. No.: 12/359,258

(22) Filed: Jan. 23, 2009

(65) Prior Publication Data

US 2010/0186178 A1 Jul. 29, 2010

(51) Int. Cl.
*C09D 11/02* (2006.01)
*C09B 23/00* (2006.01)

(52) U.S. Cl. ............... 106/31.27; 106/31.13; 106/31.32; 101/483; 101/484; 101/491; 8/657; 8/659; 8/661

(58) Field of Classification Search ............... 8/657, 659, 8/661; 106/31.13, 31.27, 31.33; 101/483, 101/484, 491
See application file for complete search history.

(56) References Cited

U.S. PATENT DOCUMENTS

| | | | |
|---|---|---|---|
| 5,340,631 A | 8/1994 | Matsuzawa et al. | |
| 5,714,386 A | 2/1998 | Roederer | |
| 7,291,212 B2 | 11/2007 | Taguchi | |
| 7,410,631 B2 | 8/2008 | Ryang | |
| 2003/0223935 A1* | 12/2003 | Gray | 424/9.6 |
| 2006/0216508 A1 | 9/2006 | Denisyuk | |
| 2006/0217478 A1 | 9/2006 | Denisyuk | |
| 2008/0316480 A1 | 12/2008 | Zhong | |
| 2010/0047356 A1* | 2/2010 | Yu et al. | 424/490 |

OTHER PUBLICATIONS

Rohit K. Rana, et al., "Nanoparticle Self-Assembly of Hierachically Ordered Microcapsule Structures," Advanced Materials, 2005, 17, 1145-1150.

* cited by examiner

*Primary Examiner* — Lorna M Douyon
*Assistant Examiner* — Amina Khan

(57) ABSTRACT

A near infrared dye composition includes a microcapsule that includes an inner core region and an outer shell. The inner core region includes a cross-linked polymer-near infrared dye aggregate. The outer shell includes nanoparticles.

15 Claims, 3 Drawing Sheets

NEAR INFRARED DYE COMPOSITION

CROSS-REFERENCE TO RELATED APPLICATIONS

N/A

STATEMENT REGARDING FEDERALLY SPONSORED RESEARCH OR DEVELOPMENT

N/A

BACKGROUND

Inkjet printers are now very common and affordable and allow one to obtain decent print quality. They are used in home printing, office printing and commercial printing. In inkjet printers, print heads are used to eject ink droplets very accurately to place them on a desired location on a medium. The print head normally comprises a large number of nozzles, often, more than 400 nozzles. As a general rule, the larger the number of nozzles, the greater is the improvement of the print quality and speed. Frequently, the nozzles become blocked because of the usage of pigmented inks or inks containing particles. Sometimes, one or more nozzle orifices may contain dried ink and fresh ink cannot be ejected. One result of this condition is the formation of streaks, which lead to poor print quality.

NIR absorbing dyes are added to the ink to monitor the condition of the nozzles. NIR absorbing dyes may be employed by extending the conjugation so that the absorption can be shifted to the range of 680 to 850 nm range. Some examples of compounds that show near infrared absorption are cyanine dyes. However, cyanine dyes tend to be or become unstable in ink.

BRIEF DESCRIPTION OF THE DRAWINGS

The drawings provided herein are for the purpose of facilitating the understanding of certain embodiments of the present invention and are provided by way of illustration and not limitation on the scope of the appended claims.

DETAILED DESCRIPTION

Figure 1:
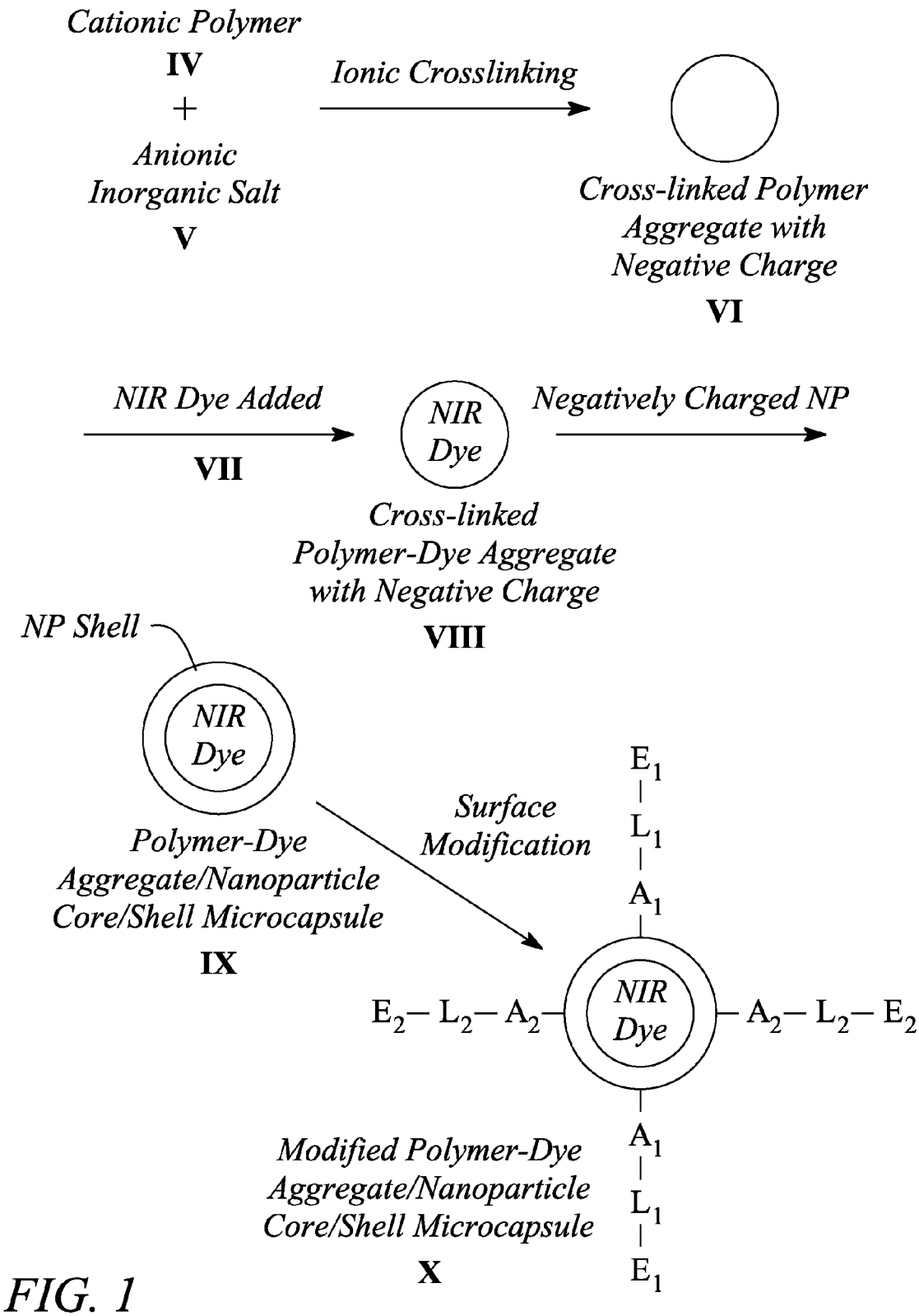
FIG. 1 illustrates a scheme for preparing an embodiment of a microcapsule composition in accordance with the present invention.

Some embodiments of the present invention are directed to near infrared dye compositions. The compositions comprise a microcapsule comprising an inner core region comprising a cross-linked polymer-near infrared dye aggregate and an outer shell comprising nanoparticles. In some embodiments, an outer surface of the shell is functionalized by the presence of one or more functional groups to enhance homogeneity of mixtures of the composition with a polar medium. In some embodiments, the cross-linked polymer is an ionically cross-linked polymer. In some embodiments, the cross-linked polymer comprises an ionic polymer and an inorganic or organic ion wherein the ionic charges of the ionic polymer and the inorganic or organic ion are complementary. In some embodiments, the near infrared dye is a cyanine dye. In some embodiments, microencapsulation, as provided herein, renders commercially available cyanine dyes more stable for use in ink formulations.

Some embodiments of the present invention are directed to an inkjet ink composition that comprises an inkjet printing ink and an additive, wherein the additive is the near infrared dye composition discussed above. Other embodiments of the present invention are directed to a method for preparing an inkjet ink formulation. The method comprises combining an inkjet ink with a composition comprising a microcapsule comprising (i) an inner core region comprising a cross-linked polymer-near infrared dye aggregate and (ii) an outer shell comprising nanoparticles, wherein the composition is present in an amount sufficient to detect ink blockage of a nozzle of an inkjet printer and to improve print quality of the inkjet printer.

As mentioned above, the microcapsule of embodiments of the present compositions comprises an inner core region comprising a cross-linked polymer-near infrared dye aggregate and an outer shell comprising nanoparticles. In some embodiments, the polymer that is part of the aggregate, and is employed to form the aggregate, is an ionic polymer, either cationic or anionic. The polymer is generally about 1 to about 10,000 monomer units or more in length, or about 10 to about 10,000 monomer units in length, or about 100 to about 10,000 monomer units in length, or about 500 to about 10,000 monomer units in length, or about 1,000 to about 10,000 monomer units in length, or about 2,000 to about 10,000 monomer units in length, or about 3,000 to about 10,000 monomer units in length, or about 5,000 to about 10,000 monomer units in length, or about 10 to about 8,000 monomer units in length, or about 100 to about 8,000 monomer units in length, or about 1,000 to about 8,000 monomer units in length, or about 100 to about 7,000 monomer units in length, for example. The number of monomer units depends on the number of atoms in the monomer unit chain, and the composition of the monomer unit, for example. The molecular weight of the polymer is about 90 to about 900,000 or more, or about 180 to about 900,000, or about 1,000 to about 900,000, or about 10,000 to about 900,000, or about 100,000 to about 900,000, or about 100 to about 750,000, or about 500 to about 750,000, or about 1,000 to about 750,000, or about 10,000 to about 750,000, or about 100,000 to about 750,000, or about 100 to about 500,000, or about 200 to about 500,000, or about 1,000 to about 500,000, or about 10,000 to about 500,000, or about 100,000 to about 500,000, for example. In some embodiments, the monomer units of the polymer comprise carbon atoms and may additionally comprise one or more heteroatoms such as, for example, oxygen, sulfur, nitrogen, phosphorus, and silicon.

The polymer may be linear or branched or a combination thereof. A linear polymer comprises a linear chain of atoms and a branched polymer comprises a branched chain of atoms. Each atom of the linear chain may have one or more substituents in place of hydrogen. In some embodiments, the polymer may be a copolymer comprising more than one type of monomer unit. The relationship of the different monomer units in the polymer may be alternating, random, and periodic for example, and may also be in a block copolymer arrangement where blocks of repeating monomer units form the polymer chain.

In some embodiments, cationic polymers that are part of the polymer aggregate embodiments have positive charges on one or more atoms of the chain of the polymer or on one or more substituents or pendant groups of the atoms of the polymer or a combination of both. The number of positive charges on the cationic polymer should be sufficient so that the polymer can be cross-linked with an anionic cross-linking agent to form a cross-linked polymer with a negative charge. In some embodiments, the number of positive charges on the cationic polymer is in the range of about 1 to about 10,000, or about 2 to about 10,000, or about 5 to about 10,000, or about 10 to about 10,000, or about 50 to about 10,000, or about 100 to about 10,000, or about 10 to about 9,000, or about 50 to about 9,000, or about 100 to about 9,000, or about 10 to about 8,000, or about 50 to about 8,000, or about 100 to about 8,000, or about 10 to about 7,000, or about 50 to about 7,000, or about 100 to about 7,000, or about 10 to about 6,000, or about 50 to about 6,000, or about 100 to about 6,000, or about 100 to about 5,000, or about 200 to about 5,000, or about 500 to about 5,000, for example.

In some embodiments, the positive charges arise from the presence in the polymer of one or more of a quaternary or protonated amine, quaternary pyridinium, quaternary imidazolium, quaternary phosphonium, and sulfonium, for example. The amine may be, for example, a primary amine, a secondary amine or a tertiary amine, any of which may be, e.g., a monoamine, a diamine, a triamine, a polyamine, and mixtures thereof. Examples of suitable monoamines, diamines, triamines or polyamines that may be present in the polymer chain or present as a substituent on the polymer chain include ammonia, methyl amine, dimethylamine, ethylene diamine, dimethylaminopropylamine, bis-dimethylaminopropylamine (bis-DMAPA), hexemethylene diamine, benzylamine, isoquinoline, ethylamine, diethylamine, dodecylamine, tallow triethylenediamine, mono substituted monoamine, monosubstituted diamine, monosubstituted polyamine, disubstituted monoamine, disubstituted diamine, disubstituted polyamine, trisubstituted triamine, trisubstituted polyamine, multisubstituted polyamine comprising more than three substitutions provided at least one nitrogen contains a hydrogen, and mixtures thereof.

Specific examples, by way of illustration and not limitation, of cationic polymers include polyamines and polyimines wherein the polymer backbone comprises monomeric units of about 2 to about 10 carbon atoms, or about 2 to about 8 carbon atoms, or about 2 to about 6 carbon atoms or about 2 to about 5 carbon atoms, wherein the monomeric units further comprise 1 to about 5 nitrogen atoms, or 1 to about 4 nitrogen atoms, or 1 to about 3 nitrogen atoms, or 1 to about 2 nitrogen atoms. Examples of such polyamines and polyimines, by way of illustration and not limitation, include polyallylamine $H^+$, polydiallylamine $H^+$, polydimethylallylamine $H^+$, poly(L-lysine) $H^+$, polyvinylamine $H^+$, polypropylamine $H^+$, polyethylene-imine $H^+$, and derivatives thereof. Other examples of cationic polymers include, but are not limited to, poly(diallyldimethylammonium), poly(3-acrylamidopropyl)trimethylammonium, poly[2-acryloyoloxyethyl]trimethyl-ammonium, poly(3-methacrylamidopropyl)-trimethylammonium, and poly[2-methacryloyloxyethyl]trimethylammonium. The cationic polymer generally includes a counter ion, the nature of which depends on the nature of the cation, for example. Specific examples, by way of illustration and not limitation, of counter ions for cationic polymers include halogen anion such as chloride, bromide, iodide, carboxylic acid anion, phosphoric acid anion, sulfuric acid anion, hexafluorophosphorus anion, tetraphenyl boronic anion, chlorate, perchlorate, nitrate, and phenolate. Cationic polymers that may be employed in the present embodiments are commercially available or may be synthesized using standard polymerization techniques.

The cationic polymer is treated to form a polymer aggregate by combining the cationic polymer with an anionic cross-linking agent, which may be an inorganic anion or an organic anion. The nature of the anionic cross-linking agent is dependent on the nature of the cationic polymer, the molecular weight of the polymer, and the types of cations, for example. Inorganic anion cross-linking agents may comprise one or more of oxygen, sulfur, phosphorus, boron, fluorine, for example. Specific examples, by way of illustration and not limitation, of inorganic ions include phosphate ions (hydrogen phosphate, dihydrogen phosphate, etc.) phosphite ions (hydrogen phosphite, etc.), sulfate ions (sulfate, hydrogen sulfate, etc.) sulfite ions, hexafluorophosphorus anion, tetraphenyl boronic anion, nitrate, perchlorate, and phenolate. Organic anionic cross-linking agents may comprise one or more of carbon, oxygen, sulfur, phosphorus, and halogen, for example. Specific examples, by way of illustration and not limitation, of organic ions include carboxylate anions (e.g., citrate, acetate (e.g., ethylenediaminetetraacetate), succinate, and malonate).

The cross-linking anionic agent includes a counter ion, the nature of which depends on the nature of the anion, the molecular weight of the polymer, and the types of cations, for example. Specific examples, by way of illustration and not limitation, of counter ions for the cross-linking anionic agent include metal cations such as, for example, sodium, potassium, calcium, magnesium, aluminum, manganese, barium, copper, zinc, iron, cobalt, and nickel.

In some embodiments, the present polymer aggregates comprise an anionic polymer, which has negative charges on one or more atoms of the chain of the polymer or on one or more substituents or pendant groups of the atoms of the polymer or a combination of both. The number of negative charges on the anionic polymer should be sufficient such that the polymer can be cross-linked with a cationic cross-linking agent to form a cross-linked polymer aggregate with a positive charge. The number of negative charges on the anionic polymer is in the range of about 1 to about 10,000, or about 2 to about 10,000, or about 5 to about 10,000, or about 10 to about 10,000, or about 50 to about 10,000, or about 100 to about 10,000, or about 10 to about 9,000, or about 50 to about 9,000, or about 100 to about 9,000, or about 10 to about 8,000, or about 50 to about 8,000, or about 100 to about 8,000, or about 10 to about 7,000, or about 50 to about 7,000, or about 100 to about 7,000, or about 10 to about 6,000, or about 50 to about 6,000, or about 100 to about 6,000, or about 100 to about 5,000, or about 200 to about 5,000, or about 500 to about 5,000, for example.

In some embodiments, the negative charges arise from the presence in the polymer of one or more of a carboxylate, phosphorate, sulfonate, sulfinate, phosphate, phosphinate, and sulfate, for example. The number of negative charges on the anionic polymer should be sufficient so that the polymer can be cross-linked with a cationic cross-linking agent to form a cross-linked polymer aggregate with a positive charge. Specific examples, by way of illustration and not limitation, of anionic polymers include polyacrylic acid, polymethacrylic acid, polystyrene sulfonic acid, poly(vinylphosphate), poly(methacryloyloxyethylsuccinate), poly(methacryloxyethylphosphate), poly(2-acrylamido-2-methyl-1-propanesulfonic acid), and poly(2-acrylamidoglycolic acid), as well as copolymers containing the above units. A copolymeric component may be hydrophobic in nature or may comprise a mixture of hydrophobic and hydrophilic components. Examples of hydrophobic components, by way of illustration and not limitation, are styrene, methyl methacrylate, butyl acrylate, and ethyl acrylate. The hydrophobic component may be present from about 1 to about 75% by weight, for example. The anionic polymer generally includes a counter ion, the nature of which depends on the nature of the anion of the anionic polymer, the molecular weight of the polymer, and the types of anions, for example. Specific examples, by way of illustration and not limitation, of counter ions for the anionic polymer include inorganic counter ions such as a metal ion (e.g. lithium, sodium, potassium, calcium, and magnesium) and organic counter ions such as, for example, ammonium, trialkylammnonium, and tetraalkylammonium. Anionic polymers that may be employed in the present embodiments are commercially available or may be synthesized using standard polymerization techniques.

The anionic polymer is treated to form a polymer aggregate by combining the anionic polymer with a cationic cross-linking agent, which may be an inorganic cation or an organic cation. The nature of the cross-linking agent is dependent on the nature of the anionic polymer, the molecular weight of the polymer, and the types of anions, for example. Inorganic cations for use as the cationic cross-linking agent may comprise one or more multivalent metal cations including, but not limited to, calcium, magnesium, copper, aluminum, manganese, barium, copper, zinc, iron, cobalt, and nickel. Specific examples, by way of illustration and not limitation, of inorganic cationic cross-linking agents include calcium, magnesium, copper, aluminum, manganese, barium, copper, zinc, iron, cobalt, and nickel. Organic cationic cross-linking agents may comprise one or more of carbon, oxygen, sulfur, phosphorus, and halogen, for example. Specific examples, by way of illustration and not limitation, of organic cations include tetraalkylammonium salts, and tetraalkyphosphonium salts. In many embodiments, the cross-linking cationic agent includes a counter ion, the nature of which depends on the nature of the inorganic cation, for example. Specific examples, by way of illustration and not limitation, of counter ions for the cross-linking cationic agent include one or more of a halogen anion, such as chloride, bromide, iodide, a carboxylic acid anion, a phosphoric acid anion, a sulfuric acid anion, a hexafluorophosphorus anion, a tetraphenyl boronic anion, a perchlorate, a nitrate, and a phenolate.

The cross-linked polymer aggregates may be formed, for example, by combining the ionic polymer and the cross-linking ionic agent in a suitable medium, which is usually an aqueous medium. The charge of the ions is complementary, that is, a cationic polymer is combined with an anionic cross-linking agent or an anionic polymer is combined with a cationic cross-linking agent. The aqueous medium employed may be solely water or may include from 0.1 to about 40 volume percent of a cosolvent such as, for example, an organic solvent that includes, but is not limited to, an alcohol, ether, and ester. The conditions for the reaction including, but not limited to, temperature, nature of the medium, pH, duration, and the order of addition of the reagents are dependent on the nature of the ionic polymer and the cross-linking agent, for example.

The concentration of the ionic polymer and the cross-linking agent is dependent on the nature of the ionic polymer and the cross-linking agent, the relative amounts of the above, and the desired composition of the aggregate formed, for example. In general, the above reagents are present in a concentration or amount sufficient to achieve the desired structure for the cross-linked polymer, which is dependent in some respects on the desired charge for the cross-linked polymer, and the nature of the near infrared dye that is to be contained within the network of the cross-linked polymer, for example. In some embodiments, the ratio of the concentration of the ionic cross-linking agent to the concentration of the ionic polymer is chosen so that the overall charge of the cross-linked polymer aggregate is the same as the charge of the ionic cross-linking agent. Thus, for example, for a cationic polymer and an anionic cross-linking agent, the resulting charge of the cross-linked polymer aggregate is anionic. In some embodiments, the aforementioned ratio is greater than 1, or greater than about 2, or greater than about 3, or greater than about 4, or greater than about 5, or greater than about 10, or greater than about 15, or greater than about 20, for example.

In some embodiments, the concentration of the ionic polymer is about 1 to about 1,000 mM, or about 2 to about 1,000 mM, or about 5 to about 1,000 mM, or about 10 to about 1,000 mM, or about 20 to about 1,000 mM, or about 50 to about 1,000 mM, or about 100 to about 1,000 mM, or about 1 to about 800 mM, or about 5 to about 800 mM, or about 10 to about 800 mM, or about 20 to about 800 mM, or about 50 to about 800 mM, or about 100 to about 800 mM, or about 1 to about 600 mM, or about 5 to about 600 mM, or about 10 to about 600 mM, or about 20 to about 600 mM, or about 50 to about 600 mM, or about 100 to about 600 mM, or about 1 to about 500 mM, or about 5 to about 500 mM, or about 10 to about 500 mM, or about 20 to about 500 mM, or about 50 to about 500 mM, or about 100 to about 500 mM, for example.

In some embodiments, the concentration of the cross-linking agent is about 1 mM to about 10 M, or about 100 mM to about 10 M, or about 500 mM to about 10 M, or about 1 mM to about 5 M, or about 100 mM to about 5 M, or about 500 mM to about 5 M, or about 1 M to about 5 M, or about 1 mM to about 2 M, or about 100 mM to about 2 M, or about 500 mM to about 2 M, or about 1 mM to about 1 M, or about 100 mM to about 1 M, or about 500 mM to about 1 M, for example.

The reaction is conducted at a moderate pH, which in some embodiments, is in the range of about 4 to about 11, or about 5 to about 10, or about 6 to about 9, or about 6.5 to about 8.5, for example. Various buffers may be used to achieve the desired pH and maintain the pH during the incubation period. Illustrative buffers include borate, phosphate, carbonate, tris (tris(hydroxymethyl)aminomethane), barbital, and bisulfate, for example. Various ancillary materials may be employed in the above methods. For example, the medium may comprise stabilizers for one or both of the medium and the reagents employed.

The medium is incubated under conditions for forming the cross-linked polymer aggregate. The incubation period may be about 1 second to about 60 minutes, or about 1 second to about 30 minutes, or about 1 second to about 15 minutes, or about 1 second to about 10 minutes, or about 1 second to about 5 minutes, or about 1 second to about 1 minute, or about 1 second to about 30 seconds, or about 5 seconds to about 60 minutes, or about 5 seconds to about 30 minutes, or about 5 seconds to about 15 minutes, or about 5 seconds to about 10 minutes, or about 5 seconds to about 5 minutes, or about 5 seconds to about 1 minute, or about 5 seconds to about 30 seconds, or about 5 seconds to about 20 seconds, or about 5 seconds to about 10 seconds, for example. Moderate temperatures are normally employed for carrying out the cross-linking reaction. The temperature may be constant during the reaction or the temperature may be varied. Incubation temperatures normally range from about 5° C. to about 99° C., or from about 15° C. to about 70° C., or from about 20° C. to about 45° C., or from about 20° C. to about 30° C., or about ambient temperature, for example.

The size of the cross-linked polymer aggregate is dependent on the concentration of the reagents, and the types of polymers and ions, for example. In some embodiments the size of the cross-linked polymer aggregates are about 1 to about 2,000 nm, or about 5 to about 2,000 nm, or about 10 to about 2,000 nm, or about 20 to about 2,000 nm, or about 50 to about 2,000 nm, or about 100 to about 2,000 nm, or about 200 to about 2,000 nm, or about 500 to about 2,000 nm, or about 1 to about 1,000 nm, or about 5 to about 1,000 nm, or about 10 to about 1,000 nm, or about 20 to about 1,000 nm, or about 50 to about 1,000 nm, or about 100 to about 1,000 nm, or about 200 to about 1,000 nm, or about 500 to about 1,000 nm, or about 1 to about 500 nm, or about 5 to about 500 nm, or about 10 to about 500 nm, or about 20 to about 500 nm, or about 50 to about 500 nm, or about 100 to about 500 nm, or about 200 to about 500 nm, for example. The size of the polymer aggregate and the nature and the size of the network of the cross-linked structure are dependent on the nature of the near infrared dye that is to be trapped within the polymer aggregate, for example.

The near infrared dye is a dye that absorbs in the near infrared (NIR) range from about 700 nm to about 1000 nm. The NIR dye may be a cyanine dye, a phthalocyanine dye, or a naphthalocyanine dye, for example. Cyanine dyes include, by way of illustration and not limitation, Cy3, Cy5, and Cy7, and derivatives thereof. The term "derivative" is meant to include modifications to the cyanine dye by addition of chemical structure (such as, e.g., rings structures) or substituents (such as, e.g., alkyl, aryl, and halogen) to the cyanine dye while still retaining the near infrared absorption of the modified dye.

In some embodiments, cyanine dyes have the formula:

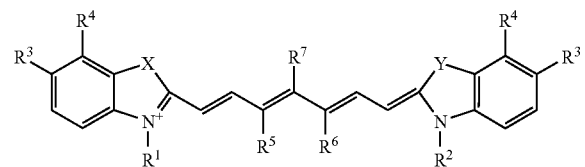

I wherein

X and Y are the same or different and may be heteroatoms, for example oxygen, and sulfur, or alternatively one or both of X and Y may be isopropylidene;

$R^1$ and $R^2$ are the same or different and may be a lower alkyl of 1 to 6 carbon atoms, or 1 to 5 carbon atoms, or 1 to 4 carbon atoms, or 1 to 3 carbon atoms, or 1 to 2 carbon atoms, where the alkyl may be straight chained or branched; the alkyl substituent may terminate in a functional group such as, for example, sulfonate, sulfoxide, sulfate, sulfite, phosphate, and phosphite;

$R^3$ and $R^4$ are the same or different (whether on the same ring or on different rings) and may be a lower alkyl of 1 to 6 carbon atoms, or 1 to 5 carbon atoms, or 1 to 4 carbon atoms, or 1 to 3 carbon atoms, or 1 to 2 carbon atoms, where the alkyl may be straight chained or branched; the alkyl substituent may terminate in a functional group such as, for example, sulfonate, sulfoxide, sulfate, sulfite, phosphate, and phosphite; specific examples of such substituted alkyl groups include alkyl sulfonates, where the alkyl group ranges from 2 to 4 carbon atoms in length; $R^3$ and $R^4$ may be taken together to form a ring, which may be a five- to seven-member ring that is aromatic or non-aromatic and which may be part of a polynuclear condensed ring system such as, for example, naphthyl, anthryl, and phenanthryl;

$R^5$ and $R^6$ are the same or different and may be a lower alkyl of 1 to 6 carbon atoms, or 1 to 5 carbon atoms, or 1 to 4 carbon atoms, or 1 to 3 carbon atoms, or 1 to 2 carbon atoms, where the alkyl may be straight chained or branched; the alkyl substituent may terminate in a functional group such as, for example, sulfonate, sulfoxide, sulfate, sulfite, phosphate, and phosphite; $R^5$ and $R^6$ may be taken together to form a ring, which may be a five- to seven-member ring that comprises one or more double bonds and is aromatic or non-aromatic, for example; and $R^7$ may be a halogen (e.g., chlorine, bromine, iodine), a lower alkyl of 1 to 6 carbon atoms, or 1 to 5 carbon atoms, or 1 to 4 carbon atoms, or 1 to 3 carbon atoms, or 1 to 2 carbon atoms, where the alkyl may be straight chained or branched; the alkyl substituent may terminate in a functional group such as, for example, sulfonate, sulfoxide, sulfate, sulfite, phosphate, and phosphite, or may terminate in a five to seven-member ring such as, for example, phenyl, cyclopentyl, and cyclohexyl, wherein the ring may comprise one or more substituents.

In some embodiments, cyanine dyes of interest for use in the present compositions and as an additive for inkjet inks have the formula:

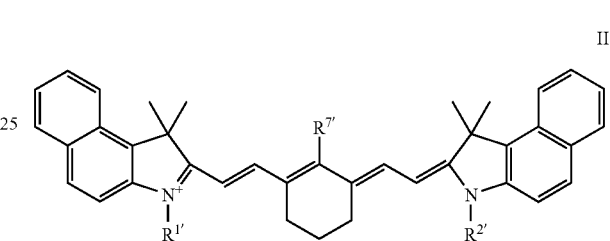

II wherein $R^{1'}$ and $R^{2'}$ are the same or different and may be a lower alkyl of 1 to 6 carbon atoms, or 1 to 5 carbon atoms, or 1 to 4 carbon atoms, or 1 to 3 carbon atoms, or 1 to 2 carbon atoms, where the alkyl may be straight chained or branched; the alkyl substituent may terminate in a functional group such as, for example, sulfate, sulfite, phosphate, and phosphite; and $R^{7'}$ may be a halogen (e.g., chlorine, bromine, iodine), for example.

In some embodiments, a cyanine dye of interest as an additive for inkjet inks has the formula below, wherein a chloro substituent is present at a methine at position 4 of the seven-methine chain of the cyanine dye:

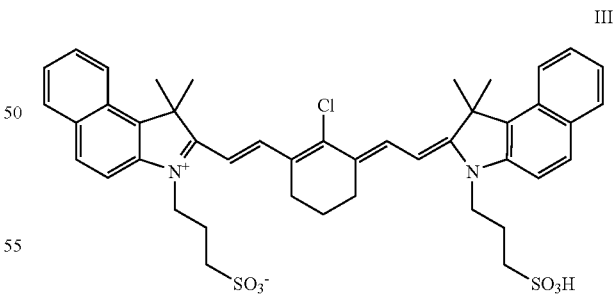

III

Following formation of the cross-linked polymer aggregate, the aggregate is treated with the near infrared dye to allow the dye to intercalate or infiltrate within the network of the cross-linked polymer aggregate. In some embodiments, the dye becomes trapped within the interstices of the cross-linked polymer aggregate. Accordingly, the choice of the polymer aggregate is dependent on the nature of the dye, such as an overall charge of the NIR dye, the solubility of the NIR dye, and the molecular weight of the NIR dye, for example. In some embodiments, the dye and the cross-linked polymer aggregate are combined in a suitable medium, which is usually an aqueous medium as discussed above. The overall charge of the polymer aggregate and the overall charge of the NIR dye should be such that the resulting aggregates have the same sign of the charge as the polymer aggregate. The conditions for the reaction such as temperature, nature of the medium, pH, duration, and the order of addition of the reagents, for example, are dependent on the nature of the polymer aggregate, and the nature of the NIR dye, for example.

The concentrations of the polymer aggregate and the NIR dye are dependent on the nature of the polymer aggregate, the nature of the NIR dye, and the desired concentration of NIR dye incorporated within the polymer aggregate, for example. In general, the above reagents are present in a concentration or amount sufficient to achieve the desired concentration of NIR dye in the cross-linked polymer aggregate consistent with the intended use of the final product in accordance with the present embodiments such as, for example, an additive in an inkjet ink. In some embodiments, the ratio of the concentration of the NIR dye to the concentration of the polymer aggregate is greater than 1, or greater than about 2, or greater than about 3, or greater than about 4, or greater than about 5, or greater than about 10, or greater than about 15, or greater than about 20, for example.

In some embodiments, the concentration of the polymer aggregate is about 1 to about 1,000 mM, or about 2 to about 1,000 mM, or about 5 to about 1,000 mM, or about 10 to about 1,000 mM, or about 20 to about 1,000 mM, or about 50 to about 1,000 mM, or about 100 to about 1,000 mM, or about 1 to about 800 mM, or about 5 to about 800 mM, or about 10 to about 800 mM, or about 20 to about 800 mM, or about 50 to about 800 mM, or about 100 to about 800 mM, or about 1 to about 600 mM, or about 5 to about 600 mM, or about 10 to about 600 mM, or about 20 to about 600 mM, or about 50 to about 600 mM, or about 100 to about 600 mM, or about 1 to about 500 mM, or about 5 to about 500 mM, or about 10 to about 500 mM, or about 20 to about 500 mM, or about 50 to about 500 mM, or about 100 to about 500 mM, for example.

In some embodiments, the concentration of the NIR dye is about 1 mM to about 10 M, or about 100 mM to about 10 M, or about 500 mM to about 10 M, or about 1 mM to about 5 M, or about 100 mM to about 5 M, or about 500 mM to about 5 M, or about 1 M to about 5 M, or about 1 mM to about 2 M, or about 100 mM to about 2 M, or about 500 mM to about 2 M, or about 1 mM to about 1 M, or about 100 mM to about 1 M, or about 500 mM to about 1 M, for example.

The reaction is conducted at a moderate pH, which in some embodiments, is in the range of about 4 to about 11, or about 5 to about 10, or about 6 to about 9, or about 6.5 to about 8.5, for example. Various buffers may be used to achieve the desired pH and maintain the pH during the incubation period. Illustrative buffers include borate, phosphate, carbonate, tris, barbital, and bisulfate. Various ancillary materials may be employed in the above methods. For example, the medium may comprise stabilizers for one or both of the medium and the reagents employed.

The medium is incubated under conditions for allowing the NIR dye to intercalate within the network of the polymer aggregate and become incorporated therein. The incubation period may be about 1 second to about 60 minutes, or about 1 second to about 30 minutes, or about 1 second to about 15 minutes, or about 1 second to about 10 minutes, or about 1 second to about 5 minutes, or about 1 second to about 1 minute, or about 1 second to about 30 seconds, or about 5 seconds to about 60 minutes, or about 5 seconds to about 30 minutes, or about 5 seconds to about 15 minutes, or about 5 seconds to about 10 minutes, or about 5 seconds to about 5 minutes, or about 5 seconds to about 1 minute, or about 5 seconds to about 30 seconds, or about 5 seconds to about 20 seconds, or about 5 seconds to about 10 seconds, for example. Moderate temperatures are normally employed for carrying out the dye incorporation step. The temperature may be constant during the reaction or the temperature may be varied. Incubation temperatures normally range from about 5° C. to about 99° C., or from about 15° C. to about 70° C., or from about 20° C. to about 45° C., or from about 20° C. to about 30° C., or about ambient temperature, for example.

The cross-linked polymer-near infrared dye aggregate composition is combined with nanoparticles to form a microcapsule comprising an inner core region comprising a cross-linked polymer-near infrared dye aggregate and an outer shell comprising nanoparticles. In some embodiments, the nanoparticles are particles that have cross-sectional dimensions in a range from about 1 nanometer (nm) to about 500 nm, or from about 1 nm to about 400 nm, or from about 1 nm to about 300 nm, or from about 1 nm to about 200 nm, or from about 1 nm to about 100 nm, or from about 1 nm to about 50 nm, or from about 5 nm to about 500 nm, or from about 5 nm to about 400 nm, or from about 5 nm to about 300 nm, or from about 5 nm to about 200 nm, or from about 5 nm to about 100 nm, or from about 5 nm to about 50 nm, or from about 10 nm to about 500 nm, or from about 10 nm to about 400 nm, or from about 10 nm to about 300 nm, or from about 10 nm to about 200 nm, or from about 10 nm to about 100 nm, or from about 10 nm to about 50 nm. The phrase "nanoparticles" refers to molecules of nanoparticles of the same composition, or molecules of nanoparticles of more than one composition, i.e., two or more different nanoparticles molecules.

In some embodiments, each nanoparticle comprises a substantially pure element. In some embodiments, each nanoparticle comprises a binary, tertiary or quaternary compound. In some embodiments, the nanoparticle comprises an element selected from the group of elements (based on the periodic table of the elements) consisting of Group 2 (IIA) elements, Group 12 (IIB) elements, Group 13 (IIIA) elements, Group 4 (IVB) elements, Group 5 (VB) elements and Group 6 (VIB) elements and combinations thereof and oxides and sulfides thereof.

In some embodiments, the nanoparticle is an oxide or sulfide of an element selected from the group consisting of Group 2 (IIA) elements, Group 12 (IIB) elements, Group 13 (IIIA) elements, Group 14 (IVA) elements, Group 4 (IVB) elements, Group 5 (VB) elements and Group 6 (VIB) elements. In some embodiments, the nanoparticle is an oxide or sulfide of a metallic material such as, for example, gold, silver, platinum, copper, iridium, palladium, iron, nickel, cobalt, titanium, haffiium, zirconium, and zinc, and alloys thereof. In some embodiments, the nanoparticle is an oxide of a Group 14 (IVA) element such as $SiO_2$. In some embodiments, the nanoparticle is a Group 4 (IVB) metal oxide such as, for example, $TiO_2$, $ZrO_2$, and $HfO_2$; or a Group 8-10 (VIII) metal oxide such as, for example, $Fe_2O_3$, CoO, and NiO.

The microcapsules of the present embodiments are formed by combining the nanoparticles and the cross-linked polymer-dye aggregates in a suitable medium such that a shell is formed from the nanoparticles where the shell has an inner core containing the cross-linked polymer-dye aggregate. The nature of the nanoparticle is dependent on the nature of the cross-linked polymer-dye aggregate, including any overall charge of the cross-linked polymer-dye aggregate, for example. In some embodiments, the medium is an aqueous medium as described above. The conditions for the reaction such as temperature, nature of the medium, pH, duration, and the order of addition of the reagents, for example, are dependent on the nature of the cross-linked polymer-dye aggregate and the nanoparticles, for example.

The concentration of the cross-linked polymer-NIR dye aggregate and the nanoparticles is dependent on the nature of the cross-linked polymer-NIR dye aggregate and of the nanoparticles, the desired composition of the microcapsule formed, and the end use of the microcapsule product, for example. In general, the above reagents are present in a concentration or amount sufficient to achieve the desired structure for the microcapsule, which comprises an outer shell of nanoparticles and an inner core of cross-linked polymer-dye aggregate. In some embodiments, the ratio of the concentration of the nanoparticles to the concentration of the cross-linked polymer-NIR dye aggregate is chosen so that the cross-linked polymer-dye aggregate is completely covered by particles with a thickness of at least about 10 nm to about 200 nm, or about 20 to about 200 nm, or about 50 to about 200 nm, or about 10 to about 150 nm, or about 20 to about 150 nm, or about 50 to about 150 nm, or about 10 to about 100 nm, or about 20 to about 100 nm, or about 50 to about 100 nm, for example. In some embodiments, the aforementioned ratio is greater than about 1, or greater than about 2, or greater than about 5, or greater than about 10, and may be in the range of about 1 to about 50, or about 1 to about 40, or about 1 to about 30, or about 1 to about 20, or about 1 to about 10, or about 1 to about 5, or about 5 to about 50, or about 10 to about 50, or about 5 to about 40, or about 5 to about 30, or about 5 to about 20, or about 5 to about 10, for example.

In some embodiments, the concentration of the cross-linked polymer-NIR dye aggregate is about 1 to about 1,000 mM, or about 2 to about 1,000 mM, or about 5 to about 1,000 mM, or about 10 to about 1,000 mM, or about 20 to about 1,000 mM, or about 50 to about 1,000 mM, or about 100 to about 1,000 mM, or about 1 to about 800 mM, or about 5 to about 800 mM, or about 10 to about 800 mM, or about 20 to about 800 mM, or about 50 to about 800 mM, or about 100 to about 800 mM, or about 1 to about 600 mM, or about 5 to about 600 mM, or about 10 to about 600 mM, or about 20 to about 600 mM, or about 50 to about 600 mM, or about 100 to about 600 mM, or about 1 to about 500 mM, or about 5 to about 500 mM, or about 10 to about 500 mM, or about 20 to about 500 mM, or about 50 to about 500 mM, or about 100 to about 500 mM, for example.

In some embodiments, the concentration of the nanoparticles is about 1 mM to about 10 M, or about 100 mM to about 10 M, or about 500 mM to about 10 M, or about 1 mM to about 5 M, or about 100 mM to about 5 M, or about 500 mM to about 5 M, or about 1 M to about 5 M, or about 1 mM to about 2 M, or about 100 mM to about 2 M, or about 500 mM to about 2 M, or about 1 mM to about 1 M, or about 100 mM to about 1 M, or about 500 mM to about 1 M, for example.

The reaction is conducted at a moderate pH, which in some embodiments, is in the range of about 3 to about 11, or about 4 to about 10, or about 5 to about 9, or about 6 to about 8, for example. Various buffers may be used to achieve the desired pH and maintain the pH during the incubation period. Illustrative buffers include borate, phosphate, carbonate, tris, barbital, and bisulfate, for example. Various ancillary materials may be employed in the above methods. For example, the medium may comprise stabilizers for one or both of the medium and the reagents employed.

The medium is incubated under conditions for forming the microcapsules. The incubation period may be about 1 second to about 60 minutes, or about 1 second to about 30 minutes, or about 1 second to about 15 minutes, or about 1 second to about 10 minutes, or about 1 second to about 5 minutes, or about 1 second to about 1 minute, or about 1 second to about 30 seconds, or about 5 seconds to about 60 minutes, or about 5 seconds to about 30 minutes, or about 5 seconds to about 15 minutes, or about 5 seconds to about 10 minutes, or about 5 seconds to about 5 minutes, or about 5 seconds to about 1 minute, or about 5 seconds to about 30 seconds, or about 10 seconds to about 20 minutes, or about 10 seconds to about 10 minutes, or about 10 seconds to about 5 minutes, or about 10 seconds to about 1 minute, for example. Moderate temperatures are normally employed for carrying out the microcapsule formation. The temperature may be constant during the reaction or the temperature may be varied. Incubation temperatures normally range from about 5° C. to about 99° C., or from about 15° C. to about 70° C., or from about 20° C. to about 45° C., or from about 20° C. to about 30° C., or about ambient temperature, for example.

The size of the microcapsule formed is dependent on the concentration of the reagents, the size of the nanoparticles, the size of the cross-linked polymer-dye aggregates, and the ligands of nanoparticles, for example. In some embodiments, the size of the microcapsules is about 0.01 microns to about 10 microns, or about 0.1 to about 10 microns, or about 0.5 to about 10 microns, or about 1 to about 10 microns, or about 0.01 microns to about 9 microns, or about 0.1 to about 9 microns, or about 0.5 to about 9 microns, or about 1 to about 9 microns, or about 0.01 microns to about 8 microns, or about 0.1 to about 8 microns, or about 0.5 to about 8 microns, or about 1 to about 8 microns, or about 0.01 microns to about 8 microns, or about 0.1 to about 8 microns, or about 0.5 to about 8 microns, or about 1 to about 8 microns, for example, in average diameter.

The size of the inner core of the microcapsules is dependent on the size of the microcapsule. In some embodiments, the size of the inner core of the microcapsules is about 0.01 microns to about 10 microns, or about 0.1 to about 10 microns, or about 0.5 to about 10 microns, or about 1 to about 10 microns, or about 0.01 microns to about 9 microns, or about 0.1 to about 9 microns, or about 0.5 to about 9 microns, or about 1 to about 9 microns, or about 0.01 microns to about 8 microns, or about 0.1 to about 8 microns, or about 0.5 to about 8 microns, or about 1 to about 8 microns, or about 0.01 microns to about 8 microns, or about 0.1 to about 8 microns, or about 0.5 to about 8 microns, or about 1 to about 8 microns, for example, in average diameter.

The thickness of the shell of the microcapsule is dependent on the size of the microcapsule. In some embodiments, the average thickness of the microcapsule shell is about 0.01 microns to about 1 microns, or about 0.05 to about 1 microns, or about 0.1 to about 1 microns, or about 0.2 to about 1 microns, or about 0.5 microns to about 1 microns, or about 0.01 to about 0.9 microns, or about 0.05 to about 0.9 microns, or about 0.1 to about 0.9 microns, or about 0.05 microns to about 0.9 microns, or about 0.1 to about 0.9 microns, or about 0.01 to about 0.8 microns, or about 0.05 to about 0.8 microns, or about 0.1 microns to about 0.8 microns, or about 0.5 to about 0.8 microns, or about 0.01 to about 0.7 microns, or about 0.05 to about 0.7 microns, or about 0.1 to about 0.7 microns, or about 0.2 microns to about 0.7 microns, or about 0.01 to about 0.6 microns, or about 0.05 to about 0.6 microns, or about 0.1 microns to about 0.6 microns, or about 0.2 to about 0.6 microns, for example.

The microcapsules formed as described above may be employed as is in the reaction medium or the microcapsules may be treated to purify them, and separate them, for example.

The microcapsules of the present embodiments are stable in an ink environment, which is usually an aqueous medium. The microcapsules embodiments maintain the incorporated NIR dye in a stable condition where the NIR dye is not susceptible to reaction with components of an inkjet ink composition. Commercial and other NIR dyes, which might otherwise be unstable in an aqueous environment, have enhanced stability when encapsulated in embodiments of the present microcapsules and do not readily undergo reaction with, for example, nucleophilic molecules. A reaction with nucleophilic molecules would result in a change to the chemical structure of the encapsulated near infrared dye thereby reducing or destroying the conjugation of the NIR dye molecule and thus losing the near infrared or characteristic absorption (color) of the NIR dye. Such a change can have a significant effect on the desired properties of the near infrared dye in applications where, for example, the NIR dye is employed as an additive in an inkjet ink to monitor nozzle condition.

In some embodiments, an outer surface of the shell of the microcapsule is functionalized to enhance the hydrophilicity of the microcapsule composition or to enhance the homogeneity of mixtures of the microcapsule composition with a polar medium such as an aqueous medium, i.e., a mixture that comprises the polar medium and the microcapsule composition. The term "hydrophilic" or "hydrophilicity" refers to a molecule that is polar and thus prefers polar molecules and prefers polar solvents. Hydrophilic molecules have an affinity for other hydrophilic moieties compared to hydrophobic moieties. Functionalization of the outer surface of the microcapsule is achieved by the presence of a functional group, or a plurality of functional group molecules, on the surface. The number of molecules of the functional group on the surface of the microcapsule is that sufficient to attain the desired level of homogeneity of the microcapsule composition in a polar medium. The number of molecules of the functional group on the surface of the microcapsule is about 4 to about 100, or about 5 to about 100, or about 6 to about 100, or about 7 to about 100, or about 8 to about 100, or about 10 to about 100, or about 4 to about 90, or about 5 to about 90, or about 6 to about 90, or about 7 to about 90, or about 8 to about 90, or about 10 to about 90, or about 4 to about 80, or about 5 to about 80, or about 6 to about 80, or about 7 to about 80, or about 8 to about 80, or about 10 to about 80, or about 4 to about 70, or about 5 to about 70, or about 6 to about 70, or about 7 to about 70, or about 8 to about 70, or about 10 to about 70, or about 4 to about 60, or about 5 to about 60, or about 6 to about 60, or about 7 to about 60, or about 8 to about 60, or about 10 to about 60, or about 4 to about 50, or about 5 to about 50, or about 6 to about 50, or about 7 to about 50, or about 8 to about 50, or about 10 to about 50, for example.

In the context of the present embodiments, the homogeneity of a mixture of the microcapsule compositions with a polar medium such as, for example, an aqueous medium, may be actual or apparent. The homogeneity of the mixture in the polar medium is actual when the microcapsule composition is soluble in the polar medium, which means that the microcapsule composition exhibits a certain amount, usually a maximum amount, of solubility in a certain volume of solvent at a specified temperature. The homogeneity of the mixture of the microcapsule composition in a polar medium is apparent when the microcapsule composition is dispersed in the polar medium such that the mixture of microcapsule composition and polar medium exhibits apparent homogeneity but the mixture is microscopically heterogeneous. Apparent homogeneity may also be referred to as dispersibility or the ability to be a dispersion. Whether the homogeneity of the mixture of the microcapsule composition is actual or apparent is dependent on the nature of the microcapsule, and the nature of the polar medium, for example.

One of skill in the art may readily determine the appropriate substitution (or substituent or functional group) on the surface of the nanoparticles for enhancing the hydrophilicity of the microcapsules or the homogeneity of mixtures of the microcapsules with a polar medium, taking into consideration one or both of the desired effect and the materials that are readily available. Such a group or functionality is in many instances a hydrophilic functionality, that is, a functionality that increases wettability of solids with water and the solubility in water of compounds to which it is bound. Such functional group or functionality can be a substituent having 1 to 50 or more atoms and can include a group having a sulfonate, sulfate, phosphate, amidine, phosphonate, carboxylate, hydroxyl particularly polyhydroxyl, amine, ether, and amide, for example. Illustrative functional groups include primary amines, secondary amines, tertiary amines, amides, nitriles, isonitriles, cyanates, isocyanates, thiocyanates, isothiocyanates, azides, thiols, thiolates, sulfides, sulfinates, sulfonates, phosphates, hydroxyls, alcoholates, phenolates, carbonyls, carboxylates, phosphines, phosphine oxides, phosphonic acids, phosphoramides, phosphates, carboxyalkyl, sulfonoxyalkyl, $CONHOCH_2COOH$, $SO_2NHCH_2COOH$, $SO_3H$, $CONHCH_2CH_2SO_3H$, $PO_3H_2$, $OPO_3H_2$, hydroxyl, carboxyl, ketone, and combinations thereof.

A functionality for linking to the surface of the nanoparticle may be present on the nanoparticles or may be introduced onto the surface of the nanoparticle. The functional group(s) may be introduced onto the surface of the nanoparticles either prior to or after the formation of the microcapsules. Such functionalities for linking to a linking group include, by way of illustration and not limitation, a primary, secondary or tertiary amine or amide group, a nitrile group, an isonitrile group, a cyanate group, an isocyanate group, a thiocyanate group, an isothiocyanate group, an azide group, a thio group, a thiolate group, a sulfide group, a sulfinate group, a sulfonate group, a phosphate group, a hydroxyl group, an alcoholate group, a phenolate group, a carbonyl group, a carboxylate group, a phosphine group, a phosphine oxide group, a phosphonic acid group, a phosphoramide group, a phosphate group, a phosphite group, as well as combinations and mixtures of such groups. Most of the above functionalities can also be utilized as functionalities for imparting hydrophilicity to the microcapsule and vice versa, as indicated above.

A linking group for linking a group for imparting hydrophilicity to the microcapsule to a functionality on the microcapsule may comprise 1 to about 100 atoms, or 1 to about 70 atoms, or 1 to 50 atoms, or 1 to 20 atoms, or 1 to about 10 atoms, or 2 to about 10 atoms, or 2 to about 20 atoms, or 3 to about 10 atoms, or about 3 to about 20 atoms, or 4 to about 10 atoms, or 4 to about 20 atoms, or 5 to about 10 atoms, or about 5 to about 20 atoms. The atoms are each independently selected from the group normally consisting of carbon and heteroatoms such as, for example, oxygen, sulfur, nitrogen, halogen and phosphorous. The number of heteroatoms in the linking group may range from 0 to about 20, or from 1 to about 15, or from 1 to about 6, or from 1 to about 5, or from 1 to about 4, or from 1 to about 3, or from 1 to 2, or from 0 to about 5, or from 0 to about 4, or from 0 to about 3, or from 0 to 2 or from 0 to 1. The length of a particular linking group can be selected to provide for convenience of synthesis. The linking groups may be aliphatic or aromatic and may be, for example, alkylene, substituted alkylene, alkylenoxy, substituted alkylenoxy, thioalkylene, substituted thioalkylene, alkenylene, substituted alkenylene, alkenylenoxy, substituted alkenylenoxy, thioalkenylene, substituted thioalkenylene, alkynylene, substituted alkynylene, alkynylenoxy, substituted alkynylenoxy, thioalkynylene, substituted thioalkynylene, arylene, substituted arylene, arylenoxy, thioarylene, and counterparts thereof comprising one or more heteroatoms. The length of the linking group in some embodiments is about 2 to about 10 atoms, or about 2 to about 9 atoms, or about 2 to about 8 atoms, or about 2 to about 7 atoms, or about 2 to about 6 atoms, or about 2 to about 5 atoms, or about 2 to about 4 atoms.

A scheme, by way of illustration and not limitation, for preparing an embodiment of a microcapsule and a modified microcapsule having hydrophilic substituents is set forth in FIG. 1. Cationic polymer IV is combined with inorganic anion V to produce a cross-linked polymer aggregate VI having a negative charge. The cross-linked polymer aggregate VI is combined with NIR dye VII to yield a cross-linked polymer-dye aggregate VIII having a negative charge. Negatively charged nanoparticles NP are combined with the cross-linked polymer-dye aggregate VIII to give a cross-linked polymer-NIR dye aggregate/nanoparticles, core/shell microcapsule IX. The surface of the shell is modified to render the cross-linked polymer-NIR dye aggregate/nanoparticles, core/shell microcapsule IX more hydrophilic and yield a modified cross-linked polymer-NIR dye aggregate/nanoparticles, core/shell microcapsule X. The surface is modified by employing a bifunctional linking group $L_2$, which provides a link between a functionality $A_2$ on the surface of the nanoparticle and a functional group $E_2$, which provides for rendering the microcapsule X more hydrophilic and, for example, more soluble or more stably dispersible in an aqueous medium.

The functionality $A_2$ is present on, or introduced on, the surface of the microcapsule for reacting with a suitable functional group on the bifunctional linking group $L_2$. The functionality for reacting may be, for example, a primary, secondary or tertiary amine or amide group, a nitrile group, an isonitrile group, a cyanate group, an isocyanate group, a thiocyanate group, an isothiocyanate group, an azide group, a thio group, a thiolate group, a sulfide group, a sulfinate group, a sulfonate group, a sulfate group, a sulfite group, a sulfone group, a sulfonamide group, a phosphate group, a hydroxyl group, an alcoholate group, a phenolate group, an epoxide group, a carbonyl group, a halomethylcarbonyl group, a carboxylate group, an activated carboxylate group (e.g., maleimide), a phosphine group, a phosphine oxide group, a phosphonic acid group, a phosphoramide group, a phosphate group, a phosphite group, as well as combinations and mixtures of such groups.

The bifunctional linking group $L_2$ has as one of its functional groups a functionality that is complementary to, and therefore reacts with, the functionality $A_2$. By way of illustration and not limitation, one of the functionalities on the bifunctional linking group $L_2$ or the functional group on the surface of the nanoparticle (or surface of the microcapsule) may include a nucleophile (such as, for example, amines, alcohols, and thiols), and the other of the functionality on the bifunctional linking group $L_2$ or the functional group on the surface of the nanoparticle may include a functional group capable of reacting with a nucleophile (such as, for example, aldehydes, isocyanates, isothiocyanates, succinimidyl esters, sulfonyl chlorides, epoxides, bromides, chlorides, iodides, and maleimides). Examples, by way of illustration and not limitation, of the reaction products from reaction of corresponding functionality on the bifunctional linking group $L_2$ and that on the nanoparticle surface include amides, amidines and phosphoramides, respectively, from reaction of amine and carboxylic acid or its nitrogen derivative or phosphoric acid (including esters thereof such as, for example, a succinimidyl ester); thioethers from reaction of a mercaptan or thiol and an activated olefin or a mercaptan or a thiol and an alkylating agent; alkylamine from reaction of an aldehyde and an amine under reducing conditions; esters from the reaction of a carboxylic acid or phosphate acid and an alcohol; and imines from reaction of an amine and an aldehyde.

The functional group $E_2$ may be the other functionality of the bifunctional linking group $L_2$ and may be the functionality for enhancing the hydrophilicity of microcapsule X. On the other hand, the functional group $E_2$ may be the functionality for enhancing the hydrophilicity of microcapsule X, which is introduced on the bifunctional linking group $L_2$ utilizing the other functionality of the linking group $L_2$, i.e., the functionality of $L_2$ that is not involved in linking to the surface of microcapsule X. In some embodiments, the functional group $E_2$ may be selected from the group consisting primary amines, secondary amines, tertiary amines, amides, nitriles, isonitriles, cyanates, isocyanates, thiocyanates, isothiocyanates, azides, thiols, thiolates, sulfides, sulfinates, sulfonates, phosphates, hydroxyls, alcoholates, phenolates, carbonyls, carboxylates, phosphines, phosphine oxides, phosphonic acids, phosphoramides and phosphates.

Figure 2:
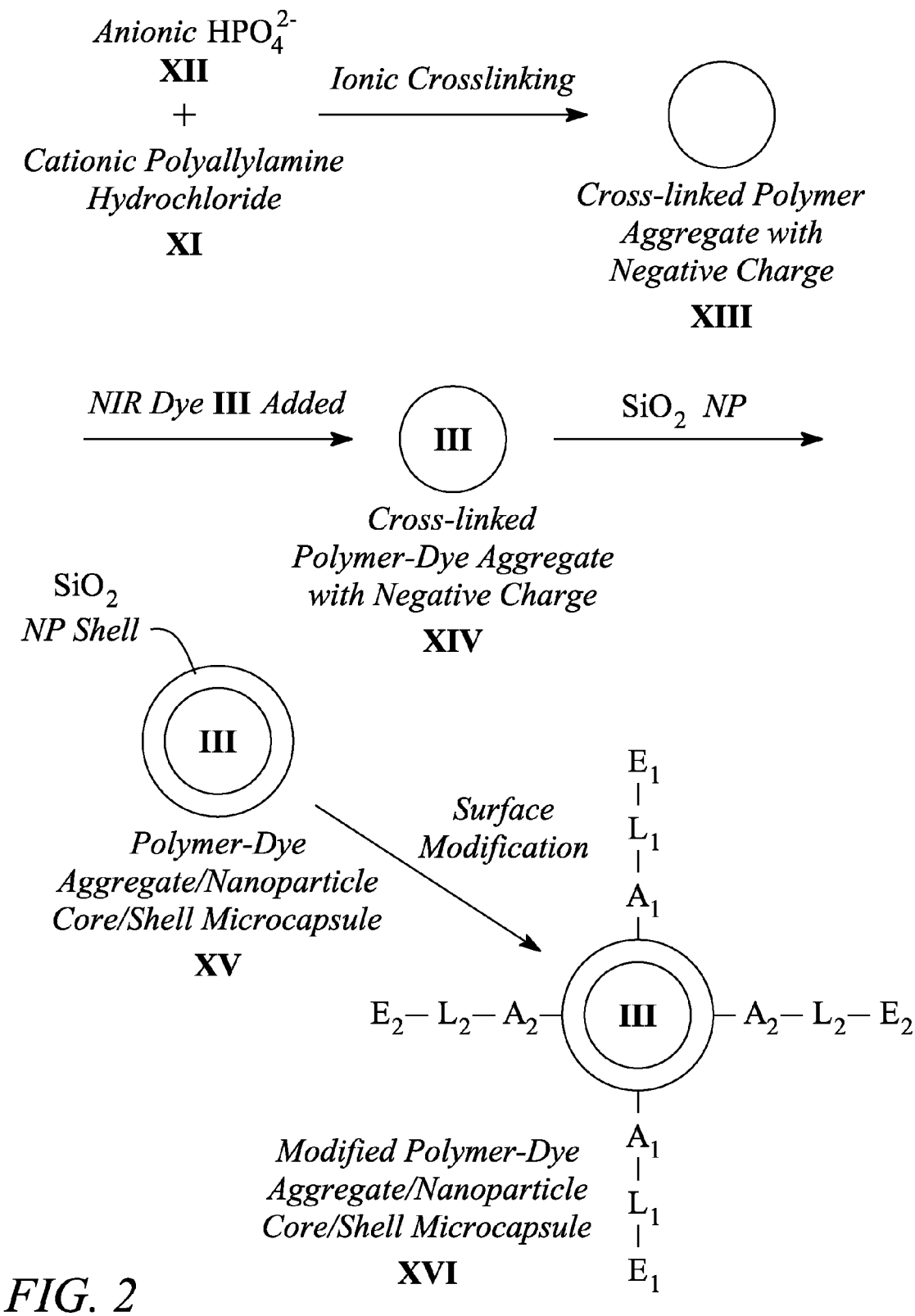
FIG. 2 illustrates another scheme for preparing an embodiment of a microcapsule composition in accordance with the present invention.

A scheme, by way of illustration and not limitation, for preparing a specific embodiment of a microcapsule and a modified microcapsule having hydrophilic substituents is set forth in FIG. 2. Cationic polyallylamine hydrochloride (PAH) XI is combined with anionic salt $HPO_4^{2-}$ (sodium counter ion) XII to produce a cross-linked polymer aggregate XIII having a negative charge. The cross-linked polymer aggregate XIII is combined with NIR dye III to yield a cross-linked PAH polymer-dye aggregate XIV having an overall negative charge. Negatively charged $SiO_2$ nanoparticles NP are combined with the cross-linked PAH polymer-dye aggregate XIV to give a cross-linked PAH polymer-dye aggregate/nanoparticle, core/shell microcapsule XV. The surface of the shell is modified to render the cross-linked PAH polymer-dye aggregate/nano-particle, core/shell microcapsule XV more hydrophilic and yield a modified cross-linked PAH polymer-dye (III) aggregate/nanoparticles, core/shell microcapsule XVI.

By way of illustration and not limitation, a nanoparticle that is an oxide may be treated to introduce a functional group $A_2$ for binding to a linking group $L_2$ by derivatization of the oxide surface using, for example, an aminoalkyl silane derivative, such as, e.g., trialkoxy 3-aminopropylsilane, aminopropyltriethoxy silane (APS), 4-aminobutyltrimethoxysilane, 4-aminobutyltriethoxysilane, and 2-aminoethyl-triethoxysilane, for example. APS reacts readily with one or more of the oxide and the siloxyl groups on metal and on silicon surfaces. APS provides primary amine groups that may be used to link to a complementary functional group on the linking group $L_2$. Other methods for treating the surface of a nanoparticle to introduce a functional group will be suggested to those skilled in the art in view of the teaching herein. In some embodiments, a functional group may be present at one end of the linking group and potential binding groups such as, for example, carboxyl groups, thiol groups, and trihalosilane groups can be employed to conduct ligand exchange reactions to introduce the water soluble ligands onto the surfaces of the particles.

The microcapsules of the present embodiments find use in many different water-based systems such as coatings & ink. Embodiments of the microcapsules may be employed in water-based ink systems, for example, inkjet inks for inkjet printers, for a variety of applications including, but not limited to, print quality, print authenticity, security, counterfeit assessment, RFID tags and barcodes, for example.

In an inkjet printer, an inkjet print head is used to eject ink droplets very accurately in predetermined locations on a substrate or medium. The quantity of nozzles in an inkjet print head can range from several nozzles to more than 400 nozzles, each for ejecting ink droplets. As a rule of thumb, the more nozzles present in the print head, generally, the better is the print quality and speed. However, any of the nozzles in the print head may get blocked or clogged from time to time, possibly due to particles in the inkjet ink dispersions or to dry conditions, for example. When a nozzle is clogged or partially blocked, the ink may, at the very least, streak on the substrate. Streaking ink equates to poor print quality. By incorporating embodiments of the present microcapsules with the inkjet ink, an opportunity to monitor print quality and nozzle operation during printing is provided. Embodiments of the present microcapsules further provide opportunities to monitor and assess print authenticity, counterfeiting, as well as other areas that use ink, because of the unique absorption range of the NIR dye in the present microcapsule compositions. Encapsulation of the NIR dye in the microcapsules yields a composition where the NIR dye is stable in the inkjet ink environment. The hydrophilic enhancing substituents on the surface of the microcapsules render the microcapsules soluble or dispersible in a stable manner in either water soluble ink formulations or solvent soluble ink formulations and blends thereof.

The amount of the microcapsule composition employed as an additive is dependent on the nature of the medium to which it is added, the condition that the additive is employed to identify, and the nature of the NIR dye, for example. For example, for monitoring the condition of one or both of inkjet ink and nozzles of an inkjet printer, the amount of the microcapsule composition added to the inkjet ink is that which results in a concentration of microcapsules in the inkjet ink that is about 0.00001% to about 10%, or about 0.0001% to about 10%, or about 0.001% to about 10%, or about 0.01% to about 10%, or about 0.1% to about 10%, or about 0.00001% to about 5%, or about 0.0001% to about 5%, or about 0.001% to about 5%, or about 0.01% to about 5%, or about 0.1% to about 5%, or about 0.00001% to about 2%, or about 0.0001% to about 2%, or about 0.001% to about 2%, or about 0.01% to about 2%, or about 0.1% to about 2%, or about 0.00001% to about 1%, or about 0.0001% to about 1%, or about 0.001% to about 1%, or about 0.01% to about 1%, or about 0.1% to about 1%, or about 0.00001% to about 0.5%, or about 0.0001% to about 0.5%, or about 0.001% to about 0.5%, or about 0.01% to about 0.5%, or about 0.1% to about 0.5%, or about 0.00001% to about 0.1%, or about 0.0001% to about 0.1%, or about 0.001% to about 0.1%, or about 0.01% to about 0.1%, or about 0.00001% to about 0.05%, or about 0.0001% to about 0.05%, or about 0.001% to about 0.05%, or about 0.01% to about 0.05%, for example. Percents are by weight.

In some embodiments, the inkjet ink is a water soluble inkjet ink (i.e., aqueous ink) based on a mixture of water, glycol and dyes or pigments, for example for most everyday printing applications. In other embodiments, the inkjet ink is a solvent-based ink made with volatile organic compounds (VOC). The solvent-based inks find use in printing of vinyl substrates (e.g., billboards and banners). In still other embodiments, the inkjet ink is either a UV-curable ink that comprises acrylic monomers with an initiator that cured by exposure to strong UV-light or a dye sublimation ink that comprises a sublimation dye and is used to print directly or indirectly on to fabrics having polyester fibers, for example. All of the inkjet inks provide a variety of colors using either the additive red-green-blue (RGB) color model or the subtractive cyan-magenta-yellow-key (CMYK) color model. Embodiments of the present microcapsule compositions may be employed in any of the aforementioned inkjet inks.

In another embodiment of the present invention, a detection system for a NIR-absorbing dye is provided. The detection system provides detection of the NIR dye in a variety of applications, as mentioned above, from print quality to counterfeit assessment, for example. In some embodiments, the detection system is incorporated into an inkjet printer.

Figure 3:
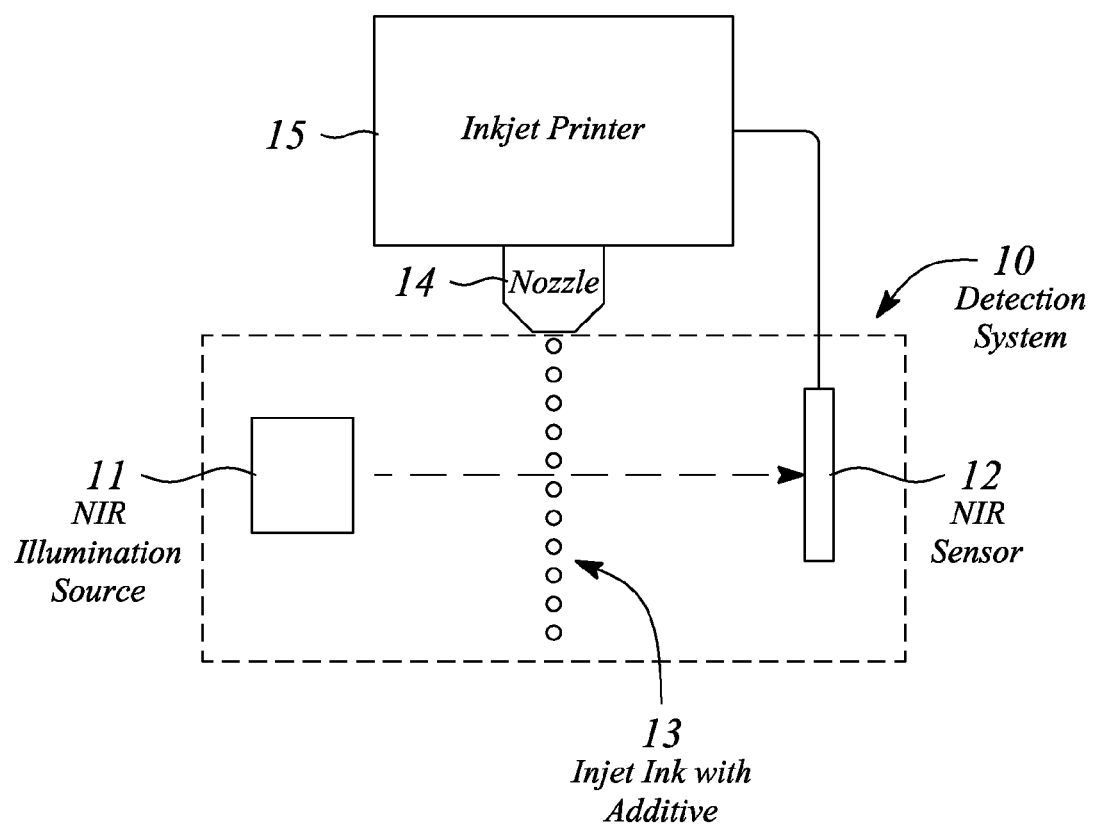
FIG. 3 illustrates a detection system for detecting print quality of an inkjet ink that comprises a microcapsule composition in accordance with an embodiment of the present invention.

FIG. 3 illustrates a block diagram of a detection system 10 for an inkjet printer. Detection system 10 comprises NIR illumination source 11 that emits infrared light at a wavelength between 700 nm and 1000 nm. NIR illumination source 11 may be a light emitting diode (LED), for example. Detection system 10 further comprises NIR sensor 12 that detects infrared light from NIR illumination source 11. NIR sensor 12 may be a photodiode that detects radiation between 700 nm and 1000 nm of wavelength, for example. Detection system 10 further comprises inkjet ink 13 that comprises a print quality-detecting amount of a microcapsule composition in accordance with the present embodiments. In the embodiment illustrated in FIG. 3, inkjet ink 13 absorbs light in the NIR range. Inkjet ink 13 is dispensed through nozzle 14 of an inkjet print head of an inkjet printer 15. NIR illumination source 11 is directed at an output path of nozzle 14 to illuminate inkjet ink 13 that is dispensed by nozzle 14. NIR sensor 12 is directed at the output path and the illumination path.

In an example of detecting print quality of inkjet printer 15, when nozzle 14 of the inkjet print head is operating efficiently, inkjet ink 13 emanates from the nozzle output in the output path. The light from the illumination source 11 is absorbed by the NIR dye in the microcapsule composition in accordance with the present embodiments, which is present in the inkjet ink 13, and NIR sensor 12 does not detect a change in the light (or a change in an amount of light) from NIR illumination source 11. When the nozzle 14 becomes clogged, whether due to the inkjet ink 13 inside nozzle 14 drying up or for another reason, little or no inkjet ink 13 is dispensed by the nozzle 14. The light from NIR illumination source 11 is no longer absorbed if the inkjet ink 13 is not dispensed from the nozzle output. As such, NIR sensor 12 begins detecting the light (e.g., detects a change in either the light or an amount of the light) from NIR illumination source 11. The detected light by NIR sensor 12 triggers NIR sensor 12 to communicate to the inkjet printer 15 that the nozzle 14 is not operating correctly. The inkjet printer 15 uses the communication from NIR sensor 12 to compensate for the clogged nozzle 14, such that print quality from the inkjet printer is maintained.

DEFINITIONS

The following provides definitions for terms and phrases used above, which were not previously defined.

The phrase "at least" as used herein means that the number of specified items may be equal to or greater than the number recited. The phrase "about" as used herein means that the number recited may differ by plus or minus 10%; for example, "about 5" means a range of 4.5 to 5.5. The term "between" when used in conjunction with two numbers such as, for example, "between about 2 and about 50" includes both of the numbers recited. Moreover, examples herein are intended to be illustrative only and are presented for discussion purposes and not by way of limitation.

The term "substituted" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, and thioaryl.

The term "heteroatom" as used herein means nitrogen, oxygen, phosphorus or sulfur. The terms "halo" and "halogen" mean a fluoro, chloro, bromo, or iodo substituent. The term "cyclic" means having an alicyclic or aromatic ring structure, which may or may not be substituted, and may or may not include one or more heteroatoms. Cyclic structures include monocyclic structures, bicyclic structures, and polycyclic structures. The term "alicyclic" is used to refer to an aliphatic cyclic moiety, as opposed to an aromatic cyclic moiety.

The phrase "aromatic ring system" or "aromatic" as used herein includes monocyclic rings, bicyclic ring systems, and polycyclic ring systems, in which the monocyclic ring, or at least a portion of the bicyclic ring system or polycyclic ring system, is aromatic (exhibits, e.g., π-conjugation). The monocyclic rings, bicyclic ring systems, and polycyclic ring systems of the aromatic ring systems may include carbocyclic rings and/or heterocyclic rings. The term "carbocyclic ring" denotes a ring in which each ring atom is carbon. The term "heterocyclic ring" denotes a ring in which at least one ring atom is not carbon and comprises 1 to 4 heteroatoms.

The term "alkyl" as used herein means a branched, unbranched, or cyclic saturated hydrocarbon group, which typically, although not necessarily, contains from 1 to about 50 carbon atoms, or 1 to about 40 carbon atoms, or 1 to about 30 carbon atoms for example. Alkyls include, but are not limited to, methyl, ethyl, n-propyl, isopropyl, n-butyl, isobutyl, t-butyl, octyl, and decyl, for example, as well as cycloalkyl groups such as cyclopentyl, and cyclohexyl, for example. The term "lower alkyl" means an alkyl group having from 1 to 6 carbon atoms. The term "higher alkyl" means an alkyl group having more than 6 carbon atoms, for example, 7 to about 50 carbon atoms, or 7 to about 40 carbon atoms, or 7 to about 30 carbon atoms or more. As used herein, the term "substituted alkyl" means an alkyl substituted with one or more substituent groups. The term "heteroalkyl" means an alkyl in which at least one carbon atom is replaced with a heteroatom. If not otherwise indicated, the term "alkyl" includes unsubstituted alkyl, substituted alkyl, lower alkyl, and heteroalkyl.

As used herein, the term "alkenyl" means a linear, branched or cyclic hydrocarbon group of 2 to about 50 carbon atoms, or 2 to about 40 carbon atoms, or 2 to about 30 carbon atoms or more containing at least one double bond, such as ethenyl, n-propenyl, isopropenyl, n-butenyl, isobutenyl, octenyl, decenyl, tetradecenyl, hexadecenyl, eicosenyl, and tetracosenyl, for example. The term "lower alkenyl" means an alkenyl having from 2 to 6 carbon atoms. The term "higher alkenyl" means an alkenyl group having more than 6 carbon atoms, for example, 7 to about 50 carbon atoms, or 7 to about 40 carbon atoms, or 7 to about 30 carbon atoms or more. The term "substituted alkenyl" means an alkenyl or cycloalkenyl substituted with one or more substituent groups. The term "heteroalkenyl" means an alkenyl or cycloalkenyl in which at least one carbon atom is replaced with a heteroatom. If not otherwise indicated, the term "alkenyl" includes unsubstituted alkenyl, substituted alkenyl, lower alkenyl, and heteroalkenyl.

As used herein, the term "alkynyl" means a linear, branched or cyclic hydrocarbon group of 2 to about 50 carbon atoms, or 2 to about 40 carbon atoms, or 2 to about 30 carbon atoms or more containing at least one triple bond, such as ethynyl, n-propynyl, isopropynyl, n-butynyl, isobutynyl, octynyl, decynyl, tetradecynyl, hexadecynyl, eicosynyl, and tetracosynyl, for example. The term "lower alkynyl" means an alkynyl having from 2 to 6 carbon atoms. The term "higher alkynyl" means an alkynyl group having more than 6 carbon atoms, for example, 7 to about 50 carbon atoms, or 7 to about 40 carbon atoms, or 7 to about 30 carbon atoms or more. The term "substituted alkynyl" means an alkynyl or cycloalkynyl substituted with one or more substituent groups. The term "heteroalkynyl" means an alkynyl or cycloalkynyl in which at least one carbon atom is replaced with a heteroatom. If not otherwise indicated, the term "alkynyl" includes unsubstituted alkynyl, substituted alkynyl, lower alkynyl, and heteroalkynyl.

The term "alkylene" as used herein means a linear, branched or cyclic alkyl group in which two hydrogen atoms are substituted at locations in the alkyl group, having 1 to about 50 carbon atoms, or 1 to about 40 carbon atoms, or 1 to about 30 carbon atoms. Alkylene linkages thus include —$CH_2CH_2$— and —$CH_2CH_2CH_2$—, for example, as well as substituted versions thereof wherein one or more hydrogen atoms are replaced with a non-hydrogen substituent. The term "lower alkylene" refers to an alkylene group containing from 2 to 6 carbon atoms. The term "higher alkylene" means an alkylene group having more than 6 carbon atoms, for example, 7 to about 50 carbon atoms, or 7 to about 40 carbon atoms, or 7 to about 30 carbon atoms or more. As used herein, the term "substituted alkylene" means an alkylene substituted with one or more substituent groups. As used herein, the term "heteroalkylene" means an alkylene wherein one or more of the methylene units are replaced with a heteroatom. If not otherwise indicated, the term "alkylene" includes heteroalkylene.

The term "alkenylene" as used herein means an alkylene containing at least one double bond, such as ethenylene (vinylene), n-propenylene, n-butenylene, and n-hexenylene, for example, as well as substituted versions thereof wherein one or more hydrogen atoms are replaced with a non-hydrogen substituent, having 1 to about 50 carbon atoms, or 1 to about 40 carbon atoms, or 1 to about 30 carbon atoms. The term "lower alkenylene" refers to an alkenylene group containing from 2 to 6 carbon atoms. The term "higher alkenylene" means an alkenylene group having more than 6 carbon atoms, for example, 7 to about 50 carbon atoms, or 7 to about 40 carbon atoms, or 7 to about 30 carbon atoms or more. As used herein, the term "substituted alkenylene" means an alkenylene substituted with one or more substituent groups. As used herein, the term "heteroalkenylene" means an alkenylene wherein one or more of the alkenylene units are replaced with a heteroatom. If not otherwise indicated, the term "alkenylene" includes heteroalkenylene.

The term "alkynylene" as used herein means an alkylene containing at least one triple bond, such as ethynylene, n-propynylene, n-butynylene, and n-hexynylene, for example, having 1 to about 50 carbon atoms, or 1 to about 40 carbon atoms, or 1 to about 30 carbon atoms. The term "lower alkynylene" refers to an alkynylene group containing from 2 to 6 carbon atoms. The term "higher alkynylene" means an alkynylene group having more than 6 carbon atoms, for example, 7 to about 50 carbon atoms, or 7 to about 40 carbon atoms, or 7 to about 30 carbon atoms or more. As used herein, the term "substituted alkynylene" means an alkynylene substituted with one or more substituent groups. As used herein, the term "heteroalkynylene" means an alkynylene wherein one or more of the alkynylene units are replaced with a heteroatom. If not otherwise indicated, the term "alkynylene" includes heteroalkynylene.

The term "alkoxy" as used herein means an alkyl group bound to another chemical structure through a single, terminal ether linkage, having 1 to about 50 carbon atoms, or 1 to about 40 carbon atoms, or 1 to about 30 carbon atoms. As used herein, the term "lower alkoxy" means an alkoxy group, wherein the alkyl group contains from 1 to 6 carbon atoms, and includes, for example, methoxy, ethoxy, n-propoxy, isopropoxy, and t-butyloxy. The term "higher alkoxy" means an alkoxy group wherein the alkyl group has more than 6 carbon atoms, for example, 7 to about 50 carbon atoms, or 7 to about 40 carbon atoms, or 7 to about 30 carbon atoms or more. As used herein, the term "substituted alkoxy" means an alkoxy substituted with one or more substituent groups. The term "heteroalkoxy" means an alkoxy in which at least one carbon atom is replaced with a heteroatom. If not otherwise indicated, the term "alkoxy" includes unsubstituted alkoxy, substituted alkoxy, lower alkoxy, and heteroalkoxy.

The term "alkenoxy" as used herein means an alkenyl group bound to another chemical structure through a single, terminal ether linkage, having 1 to about 50 carbon atoms, or 1 to about 40 carbon atoms, or 1 to about 30 carbon atoms. As used herein, the term "lower alkenoxy" means an alkenoxy group, wherein the alkenyl group contains from 2 to 6 carbon atoms, and includes, for example, ethenoxy, n-propenoxy, isopropenoxy, and t-butenoxy. The term "higher alkenoxy" means an alkenoxy group wherein the alkenyl group has more than 6 carbon atoms, for example, 7 to about 50 carbon atoms, or 7 to about 40 carbon atoms, or 7 to about 30 carbon atoms or more. As used herein, the term "substituted alkenoxy" means an alkenoxy substituted with one or more substituent groups. The term "heteroalkenoxy" means an alkenoxy in which at least one carbon atom is replaced with a heteroatom. If not otherwise indicated, the term "alkenoxy" includes unsubstituted alkenoxy, substituted alkenoxy, lower alkenoxy, higher alkenoxy and heteroalkenoxy.

The term "alkynoxy" as used herein means an alkynyl group bound to another chemical structure through a single, terminal ether linkage, having 1 to about 50 carbon atoms, or 1 to about 40 carbon atoms, or 1 to about 30 carbon atoms. As used herein, the term "lower alkynoxy" means an alkynoxy group, wherein the alkynyl group contains from 2 to 6 carbon atoms, and includes, for example, ethynoxy, n-propynoxy, isopropynoxy, and t-butynoxy. The term "higher alkynoxy" means an alkynoxy group wherein the alkynyl group has more than 6 carbon atoms, for example, 7 to about 50 carbon atoms, or 7 to about 40 carbon atoms, or 7 to about 30 carbon atoms or more. As used herein, the term "substituted alkynoxy" means an alkynoxy substituted with one or more substituent groups. The term "heteroalkynoxy" means an alkynoxy in which at least one carbon atom is replaced with a heteroatom. If not otherwise indicated, the term "alkynoxy" includes unsubstituted alkynoxy, substituted alkynoxy, lower alkynoxy, higher alkynoxy and heteroalkynoxy.

The term "thioalkyl" as used herein means an alkyl group bound to another chemical structure through a single, terminal thio (sulfur) linkage, having 1 to about 50 carbon atoms, or 1 to about 40 carbon atoms, or 1 to about 30 carbon atoms. As used herein, the term "lower thioalkyl" means a thioalkyl group, wherein the alkyl group contains from 1 to 6 carbon atoms, and includes, for example, thiomethyl, thioethyl, and thiopropyl. The term "higher thioalkyl" means a thioalkyl group wherein the alkyl group has more than 6 carbon atoms, for example, 7 to about 50 carbon atoms, or 7 to about 40 carbon atoms, or 7 to about 30 carbon atoms or more. As used herein, the term "substituted thioalkyl" means a thioalkyl substituted with one or more substituent groups. The term "heterothioalkyl" means a thioalkyl in which at least one carbon atom is replaced with a heteroatom. If not otherwise indicated, the term "thioalkyl" includes unsubstituted thioalkyl, substituted thioalkyl, lower thioalkyl, and heterothioalkyl.

The term "thioalkenyl" as used herein means an alkenyl group bound to another chemical structure through a single, terminal thio (sulfur) linkage, having 1 to about 50 carbon atoms, or 1 to about 40 carbon atoms, or 1 to about 30 carbon atoms. As used herein, the term "lower thioalkenyl" means a thioalkenyl group, wherein the alkenyl group contains from 2 to 6 carbon atoms, and includes, for example, thioethenyl and thiopropenyl. The term "higher thioalkenyl" means a thioalkenyl group wherein the alkenyl group has more than 6 carbon atoms, for example, 7 to about 50 carbon atoms, or 7 to about 40 carbon atoms, or 7 to about 30 carbon atoms or more. As used herein, the term "substituted thioalkenyl" means a thioalkenyl substituted with one or more substituent groups. The term "heterothioalkenyl" means a thioalkenyl in which at least one carbon atom is replaced with a heteroatom. If not otherwise indicated, the term "thioalkenyl" includes unsubstituted thioalkenyl, substituted thioalkenyl, lower thioalkenyl, and heterothioalkenyl.

The term "thioalkynyl" as used herein means an alkynyl group bound to another chemical structure through a single, terminal thio (sulfur) linkage, having 1 to about 50 carbon atoms, or 1 to about 40 carbon atoms, or 1 to about 30 carbon atoms. As used herein, the term "lower thioalkynyl" means a thioalkynyl group, wherein the alkyl group contains from 2 to 6 carbon atoms, and includes, for example, thioethynyl and thiopropylynyl. The term "higher thioalkynyl" means a thioalkynyl group wherein the alkynyl group has more than 6 carbon atoms, for example, 7 to about 50 carbon atoms, or 7 to about 40 carbon atoms, or 7 to about 30 carbon atoms or more. As used herein, the term "substituted thioalkynyl" means a thioalkynyl substituted with one or more substituent groups. The term "heterothioalkynyl" means a thioalkynyl in which at least one carbon atom is replaced with a heteroatom. If not otherwise indicated, the term "thioalkynyl" includes unsubstituted thioalkynyl, substituted thioalkynyl, lower thioalkynyl, and heterothioalkynyl.

The term "aryl" means a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to 30 carbon atoms or more. Aryl groups include, for example, phenyl, naphthyl, anthryl, phenanthryl, biphenyl, diphenylether, diphenylamine, and benzophenone. The term "substituted aryl" refers to an aryl group comprising one or more substituent groups. The term "heteroaryl" means an aryl group in which at least one carbon atom is replaced with a heteroatom. If not otherwise indicated, the term "aryl" includes unsubstituted aryl, substituted aryl, and heteroaryl.

The term "aryloxy" as used herein means an aryl group bound to another chemical structure through a single, terminal ether (oxygen) linkage, having from 5 to about 50 carbon atoms, or 5 to about 40 carbon atoms, or 5 to 30 carbon atoms or more. The term "phenoxy" as used herein is aryloxy wherein aryl is phenyl.

The term "thioaryl" as used herein means an aryl group bound to another chemical structure through a single, terminal thio (sulfur) linkage, having from 5 to about 50 carbon atoms, or 5 to about 40 carbon atoms, or 5 to 30 carbon atoms or more. The term "thiophenyl" as used herein is thioaryl wherein aryl is phenyl.

EXAMPLE

Unless otherwise indicated, materials in the experiments below may be purchased from Aldrich Chemical Company, St. Louis Mo.

Preparation of Cationic Polymer-Dye Aggregate:

Polyallylamine hydrochloride (PAH) (0.1 mL of 100 mg/mL solution in 10 mL water) is combined with potassium hydrogen phosphate ($K_2(HPO_4)$) so that the resulting concentration of hydrogen phosphate is 5 mM in water and the mixture is stirred gently for 15 minutes at room temperature and pH 7 to give cross-linked PAH polymer. The resulting solution is held for 60 minutes and then is combined with cyanine dye III so that the concentration of cyanine dye III is 2 mM in the reaction medium. The combination is stirred gently for 15 minutes at room temperature and pH of 7 to give cross-linked PAH polymer-III dye aggregate. To the resulting reaction medium is added 0.1 mL of a solution of silica particles (10% $SiO_2$ in water, pH 7, average particle diameter of 50 nm). The reaction medium is stirred gently for 60 minutes at room temperature. The reaction medium increases in cloudiness as microcapsule formation occurs. Examination of the reaction medium by means of optical microscopy reveals microcapsules that are spherical and have a core/shell structure. The average diameter of the microcapsules is 100 nm. The presence of the cross-linked PAH polymer-III dye aggregate in the core of the microcapsule is evident by NIR absorption. The microcapsule composition is purified by freeze drying and washing with acetone.

Use of the Microcapsules as an Additive in an Inkjet Ink:

Microcapsules from above (5 mg of freeze dried sample) are added to inkjet ink (20 g). The resulting ink is placed in a nozzle 14 of an inkjet printer 15, which includes detection system 10. In normal operation, inkjet ink (with microcapsule additive) emanates from the nozzle output in the output path. Light from illumination source 11 is absorbed by dye III in the microcapsule composition and NIR sensor 12 does not detect a change in the light (or a change in an amount of light) from illumination source 11. When nozzle 14 becomes clogged, whether due to inkjet ink inside nozzle 14 drying up or for another reason, little or no inkjet ink is dispensed by nozzle 14. The light from NIR illumination source 11 is no longer absorbed if inkjet ink is not dispensed from the nozzle output. As such, NIR sensor 12 begins detecting the light (e.g., detects a change in either the light or an amount of the light) from NIR illumination source 11. The detected light by NIR sensor 12 triggers NIR sensor 12 to communicate to inkjet printer 15 that nozzle 14 is not operating correctly. Inkjet printer 15 uses the communication from NIR sensor 12 to compensate for clogged nozzle 14, such that print quality from the inkjet printer is maintained.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims. Furthermore, the foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed. Many modifications and variations are possible in view of the above teachings. The embodiments were chosen and described in order to explain the principles of the invention and its practical applications and to thereby enable others skilled in the art to utilize the invention.

What is claimed is:

1. A near infrared dye composition, the composition comprising:
   a microcapsule comprising (i) an inner core region comprising a cross-linked polymer-near infrared dye aggregate and (ii) an outer shell comprising nanoparticles, wherein the outer shell further comprises a bifunctional linking group of 2 to 10 atoms in length wherein the bifunctional linking group comprises a first functional group and a second functional group wherein the first functional group is linked to a complementary functional group of the outer shell and the second functional group is or is linked to a functional group for enhancing the hydrophilicity of the microcapsule.

2. The composition according to claim 1, wherein the functional group of the outer shell comprises a member selected from the group consisting of a primary, secondary or tertiary amine or amide group, a nitrile group, an isonitrile group, a cyanate group, an isocyanate group, a thiocyanate group, an isothiocyanate group, an azide group, a thio group, a thiolate group, a sulfide group, a sulfinate group, a sulfonate group, a sulfate group, a sulfite group, a sulfone group, a sulfonamide group, a phosphate, a hydroxyl group, alcoholate group, a phenolate group, an epoxide group, a carbonyl group, a halomethylcarbonyl group, a carboxylate group, an activated carboxylate group, a phosphine group, a phosphine oxide group, a phosphonic acid group, a phosphoramide group, a phosphate group, and a phosphite group or combinations and mixtures of such groups.

3. The composition according to claim 1, wherein the functional group for enhancing the hydrophilicity of the microcapsule comprises a member selected from the group consisting of primary amines, secondary amines, tertiary amines, amides, nitriles, isonitriles, cyanates, isocyanates, thiocyanates, isothiocyanates, azides, thiols, thiolates, sulfides, sulfinates, sulfonates, phosphates, hydroxyls, alcoholates, phenolates, carbonyls, carboxylates, phosphines, phosphine oxides, phosphonic acids, phosphoramides and phosphates.

4. The composition according to claim 1, wherein the cross-linked polymer of the aggregate is an ionically cross-linked polymer.

5. The composition according to claim 1, wherein the cross-linked polymer of the aggregate comprises a cationic polymer and an anionic ion.

6. The composition according to claim 5, wherein the cationic polymer is a polyamine or a polyimine.

7. The composition according to claim 5, wherein the anionic ion is an inorganic ion or an organic ion.

8. The composition according to claim 1, wherein the near infrared dye of the aggregate is a cyanine dye.

9. The composition according to claim 8, wherein the cyanine dye is chloro-substituted at a methine of the cyanine dye.

10. The composition according to claim 1, wherein the nanoparticles comprise a material selected from the group consisting of silicon dioxide, titanium dioxide, hafnium dioxide and zirconium dioxide.

11. An inkjet ink composition comprising an inkjet ink and an additive, wherein the additive is the near infrared dye composition according to claim 1.

12. A near infrared dye composition, the composition comprising:
 a microcapsule comprising (i) an inner core region comprising a cationically cross-linked polymer-near infrared dye aggregate and (ii) an outer shell comprising nanoparticles comprising an outer surface functionalized to enhance homogeneity of mixtures of the near infrared dye composition with a polar medium, wherein the outer shell further comprises a bifunctional linking group of 2 to 10 atoms in length wherein the bifunctional linking group comprises a first functional group and a second functional group wherein the first functional group is linked to a complementary functional group of the outer shell and the second functional group is or is linked to a functional group for enhancing the hydrophilicity of the microcapsule.

13. The composition according to claim 12, wherein the near infrared dye of the aggregate is a cyanine dye.

14. The composition according to claim 12, wherein the nanoparticles comprise a material selected from the group consisting of silicon dioxide, titanium dioxide, halfnium dioxide and zirconium dioxide.

15. A method for preparing an inkjet ink formulation, the method comprising combining an inkjet ink with a composition comprising a microcapsule comprising (i) an inner core region comprising a cross-linked polymer-near infrared dye aggregate and (ii) an outer shell comprising nanoparticles, wherein the outer shell further comprises a bifunctional linking group of 2 to 10 atoms in length wherein the bifunctional linking group comprises a first functional group and a second functional group wherein the first functional group is linked to a complementary functional group of the outer shell and the second functional group is or is linked to a functional group for enhancing the hydrophilicity of the microcapsule and wherein the composition is present in an amount sufficient to detect ink blockage of a nozzle of an inkjet printer and to improve print quality of the inkjet printer.

* * * * *

UNITED STATES PATENT AND TRADEMARK OFFICE
CERTIFICATE OF CORRECTION

| | | |
|---|---|---|
| PATENT NO. | : 7,927,410 B2 | Page 1 of 1 |
| APPLICATION NO. | : 12/359258 | |
| DATED | : April 19, 2011 | |
| INVENTOR(S) | : Zhang-Lin Zhou et al. | |

It is certified that error appears in the above-identified patent and that said Letters Patent is hereby corrected as shown below:

In column 24, line 31, in Claim 2, before "alcoholate" insert -- an --.

Signed and Sealed this
Twenty-ninth Day of November, 2011

David J. Kappos
*Director of the United States Patent and Trademark Office*